(12) United States Patent
Chen et al.

(10) Patent No.: US 12,470,126 B2
(45) Date of Patent: Nov. 11, 2025

(54) POWER SYSTEM AND CIRCULATING CURRENT SUPPRESSION METHOD THEREOF

(71) Applicant: Delta Electronics, Inc., Taoyuan (TW)

(72) Inventors: Hsin-Chih Chen, Taoyuan (TW); Li-Hung Wang, Taoyuan (TW); Chao-Li Kao, Taoyuan (TW); Yi-Ping Hsieh, Taoyuan (TW); Hung-Chieh Lin, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 209 days.

(21) Appl. No.: 18/243,626

(22) Filed: Sep. 7, 2023

(65) Prior Publication Data

US 2025/0007389 A1 Jan. 2, 2025

(30) Foreign Application Priority Data

Jun. 30, 2023 (CN) .......................... 202310790730.5

(51) Int. Cl.
*H02M 1/12* (2006.01)
*H02M 1/00* (2006.01)
(Continued)

(52) U.S. Cl.
CPC ......... *H02M 1/123* (2021.05); *H02M 1/0048* (2021.05); *H02M 7/487* (2013.01); *H02M 1/4216* (2013.01)

(58) Field of Classification Search
CPC .. H02M 7/4833; H02M 7/4837; H02M 7/487; H02M 1/4216; H02M 1/12; H02M 1/123; H02M 1/0048
See application file for complete search history.

(56) References Cited

U.S. PATENT DOCUMENTS

| | | | |
|---|---|---|---|
| 5,949,199 | A | 9/1999 | Qian et al. |
| 8,766,605 | B2 | 7/2014 | Ren et al. |

(Continued)

FOREIGN PATENT DOCUMENTS

| | | |
|---|---|---|
| CN | 102790422 A | 11/2012 |
| CN | 103248261 A | 8/2013 |

(Continued)

OTHER PUBLICATIONS

Kai Li et al., "Elimination of zero sequence circulating current between parallel operating three-level inverters", IEEE, 2016.
(Continued)

*Primary Examiner* — Alex Torres-Rivera
(74) *Attorney, Agent, or Firm* — KIRTON McCONKIE; Evan R. Witt

(57) ABSTRACT

A circulating current suppression method of a power system having a plurality of power modules is provided. Each power module includes a high-voltage bus, a low-voltage bus and a balance circuit having a neutral voltage. The circulating current suppression method includes: in each balance circuit, disposing a first capacitor electrically coupled between the high-voltage bus and the neutral voltage, and disposing a second capacitor electrically coupled between the neutral voltage and the low-voltage bus; acquiring a current effective value of an input of each power module; if detecting that the current effective value of at least one power module doesn't remain at a current reference value, determining that a circulating current occurs in the at least one power module; and operating the balance circuit of the at least one power module to charge the first capacitor or the second capacitor to regulate the neutral voltage for suppressing the circulating current.

11 Claims, 7 Drawing Sheets

(51) Int. Cl.
*H02M 7/487* (2007.01)
*H02M 1/42* (2007.01)

(56) References Cited

U.S. PATENT DOCUMENTS

| | | | | |
|---|---|---|---|---|
| 2011/0019452 | A1 | 1/2011 | Shinomoto et al. | |
| 2019/0229643 | A1* | 7/2019 | Bax | H02M 1/12 |
| 2020/0021204 | A1* | 1/2020 | Huang | H02M 7/5395 |
| 2020/0076318 | A1 | 3/2020 | Moon et al. | |
| 2024/0305218 | A1* | 9/2024 | Chen | H02M 1/123 |

FOREIGN PATENT DOCUMENTS

| | | |
|---|---|---|
| CN | 106301055 A | 1/2017 |
| CN | 109347343 A | 2/2019 |
| CN | 109495001 B | 5/2020 |
| CN | 112234854 A | 1/2021 |
| CN | 112510984 A | 3/2021 |
| CN | 112993970 A | 6/2021 |
| CN | 114726197 A | 7/2022 |
| CN | 115117986 A | 9/2022 |
| CN | 115632545 A | 1/2023 |
| CN | 115800353 A | 3/2023 |
| CN | 116345614 A | 6/2023 |
| JP | 2019004585 A | 1/2019 |
| TW | I276298 B | 3/2007 |
| TW | 201141028 A | 11/2011 |

OTHER PUBLICATIONS

Gabriel H. P. Ooi et al., "Five-level multiple-pole PWM AC-AC converters with reduced components count", IEEE, 2015.

J. Alahuhtala et al., "Space vector modulated four-wire unidirectional three-phase/level/switch (Vienna) rectifier with an additional leg for DC link voltage balancing", IEEE, 2008.

* cited by examiner

POWER SYSTEM AND CIRCULATING CURRENT SUPPRESSION METHOD THEREOF

CROSS-REFERENCE TO RELATED APPLICATION

This application claims priority to China Patent Application No. 202310790730.5, filed on Jun. 30, 2023, and the entire contents of which are incorporated herein by reference for all purposes.

FIELD OF THE INVENTION

The present disclosure relates to a power system and a circulating current suppression method thereof, and more particularly to a power system and a circulating current suppression method thereof which suppress the circulating current through controlling the voltage difference of the positive and negative DC bus capacitors.

BACKGROUND OF THE INVENTION

In applications with multiple modules connected in parallel, the size of the modules is crucial due to the large number of the modules connected in parallel. In order to reduce the size, the front-stage AC/DC topology usually adopts a unidirectional multi-level converter, and the negative terminal of the output of the rear-stage DC/DC topology is directly connected to the negative terminal of the DC bus. Based on this circuit architecture, when the voltages of the DC buses of the modules are different, it may result in a DC circulating current which reduces the power conversion efficiency. Moreover, since the front-stage AC/DC topology is unidirectional, the circulating current would cause a lot of harmonics of the input current and affect the total harmonic distortion of the input current. Additionally, excessive circulating current may lead to a potential shift at the neutral point of the multi-level converter and affects the normal operation of the entire system.

Therefore, there is a need of providing a power system and a circulating current suppression method thereof in order to overcome the drawbacks of the conventional technologies.

SUMMARY OF THE INVENTION

The present disclosure provides a power system and a circulating current suppression method thereof. The power system has a plurality of power modules. When the circulating current occurs in any of the power modules, the balance circuit of the power module is operated to regulate the neutral voltage of the balance circuit for suppressing the circulating current.

In accordance with an aspect of the present disclosure, a circulating current suppression method of a power system having a plurality of power modules is provided. Each of the plurality of power modules includes a high-voltage bus, a low-voltage bus and a balance circuit having a neutral voltage. The circulating current suppression method includes: in each balance circuit, disposing a first capacitor electrically coupled between the high-voltage bus and the neutral voltage, and disposing a second capacitor electrically coupled between the neutral voltage and the low-voltage bus; acquiring a current effective value of an input of each power module; if detecting that the current effective value of at least one power module doesn't remain at a current reference value, determining that a circulating current occurs in the at least one power module; and operating the balance circuit of the at least one power module to charge the first capacitor or the second capacitor to regulate the neutral voltage for suppressing the circulating current.

In accordance with another aspect of the present disclosure, a power system having a plurality of power modules is provided. An input of each power module receives an AC input source. Each power module includes a DC power bus, a balance circuit and a controller. The DC power bus includes a high-voltage bus and a low-voltage bus. The balance circuit includes a first capacitor, a second capacitor, a first switch, a second switch and an energy storage inductor. A negative terminal of the first capacitor is electrically connected to a positive terminal of the second capacitor, a positive terminal of the first capacitor is electrically connected to the high-voltage bus, and a negative terminal of the second capacitor is electrically connected to the low-voltage bus. A first terminal of the first switch is electrically connected to the high-voltage bus, a second terminal of the first switch is electrically connected to a first terminal of the second switch, and a second terminal of the second switch is electrically connected to the low-voltage bus. A first terminal of the energy storage inductor is electrically connected to the negative terminal of the first capacitor and the positive terminal of the second capacitor, and a second terminal of the energy storage inductor is electrically connected to the second terminal of the first switch and the first terminal of the second switch. The controller acquires a current effective value of an input of each power module. If the controller detects that the current effective value of at least one of the plurality of power modules is greater than or less than a current reference value, the controller determines that a circulating current occurs in the at least one of the plurality of power modules. The controller operates the first switch and/or the second switch of the balance circuit of the at least one of the plurality of power modules to let the energy storage inductor generate an inductor current, and a direction of the inductor current is opposite to a direction of the circulating current.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
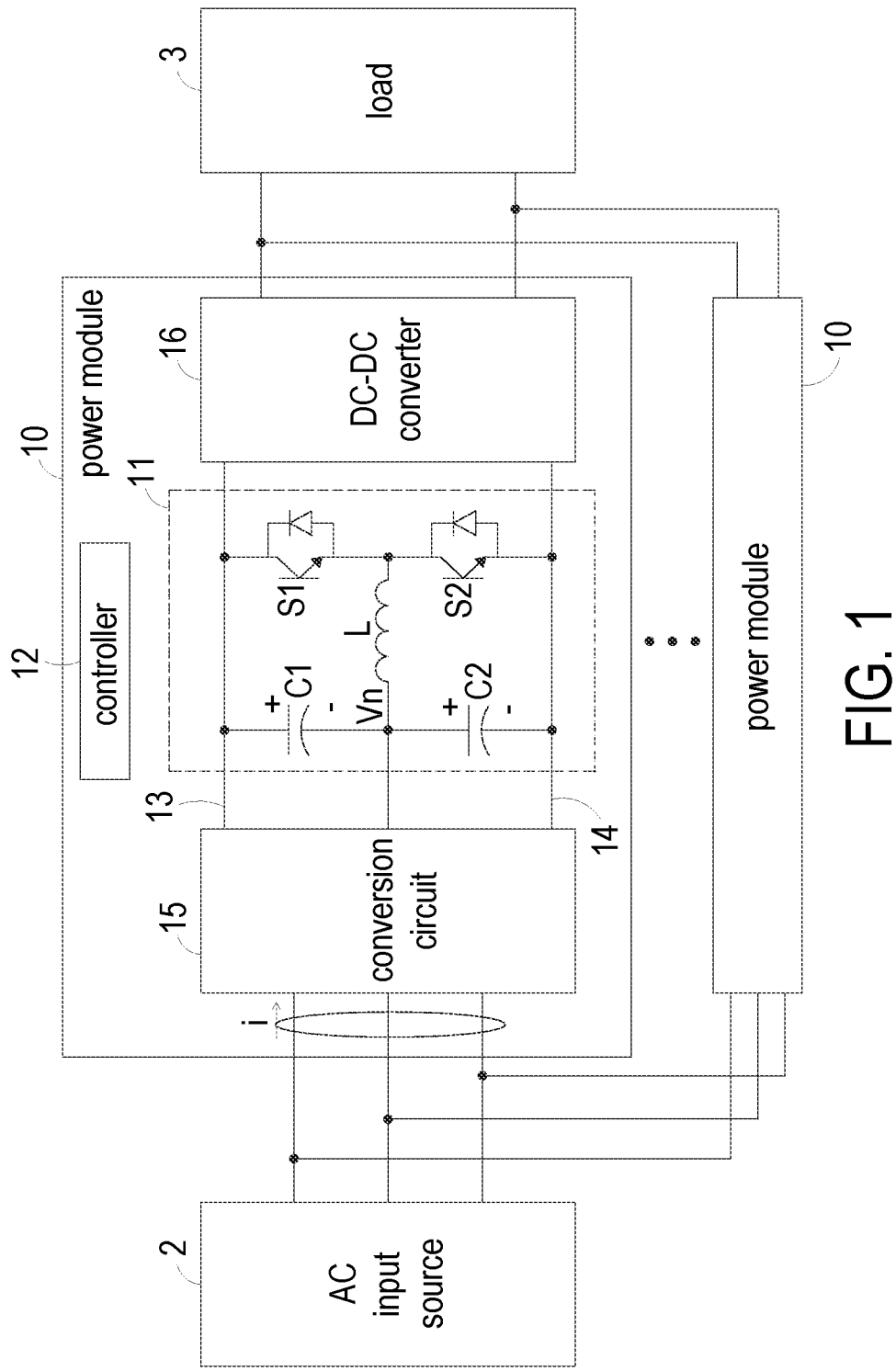
FIG. 1 is a circuit block diagram illustrating a power system according to an embodiment of the present disclosure.

FIG. 1 is a circuit block diagram illustrating a power system according to an embodiment of the present disclosure. As shown in FIG. 1, the power system 1 includes a plurality of power modules 10, and the number of the power modules 10 is an integer greater than or equal to two. The inputs of the power modules 10 receive the same AC input source 2, and the outputs of the power modules are all electrically coupled to the same load 3. Typically, the circulating current occurs in the power modules 10 electrically connected in parallel, but not limited thereto in the present disclosure.

In the power system 1, each power module 10 includes a DC power bus, a balance circuit 11 and a controller 12. The AC input source 2 provides a three-phase AC power in this embodiment, but not limited thereto. In another embodiment, the AC input source 2 may provide a single-phase AC power.

In each power module 10, the DC power bus includes a high-voltage bus 13 and a low-voltage bus 14, and the balance circuit 11 includes a first capacitor C1, a second capacitor C2, a first switch S1, a second switch S2 and an energy storage inductor L. The positive terminal of first capacitor C1 is electrically connected to the high-voltage bus 13, the negative terminal of first capacitor C1 is electrically connected to the positive terminal of second capacitor C2, and the negative terminal of second capacitor C2 is electrically connected to the low-voltage bus 14. The first capacitor C1 and the second capacitor C2 may be regarded as the positive DC bus capacitor and the negative DC bus capacitor respectively. The first terminal of first switch S1 is electrically connected to the high-voltage bus 13, the second terminal of first switch S1 is electrically connected to the first terminal of second switch S2, and the second terminal of second switch S2 is electrically connected to the low-voltage bus 14. The first terminal of energy storage inductor L is electrically connected to the negative terminal of first capacitor C1 and the positive terminal of second capacitor C2. The second terminal of energy storage inductor L is electrically connected to the second terminal of first switch S1 and the first terminal of second switch S2. In addition, the balance circuit 11 has a neutral voltage Vn coupled to the negative terminal of first capacitor C1, the positive terminal of second capacitor C2 and the first terminal of energy storage inductor L.

In FIG. 1, when the power system 1 operates under ideal conditions, the low-voltage bus 14 of each power module 10 remains at the same reference voltage, and no circulating current occurs. If any of the power modules 10 is abnormal, the low-voltage bus 14 of the abnormal power module 10 deviates from the reference voltage, resulting in circulating current flowing into the abnormal power module 10. In general, the voltage of the low-voltage bus 14 of the abnormal power module 10 is lower than the reference voltage.

The controller 12 acquires the current effective value iz of the input of every power module 10, and the current effective value iz is for example but not limited to an average value or a root-mean-square value of a current i of the input of power module 10. If the controller 12 detects that the current effective value iz of at least one power module 10 is greater than or less than the current reference value iref, the controller 12 determines that the circulating current occurs in the said at least one power module 10. Subsequently, the controller 12 operates the first switch S1 and second switch S2 of the balance circuit 11 of the power module 10 in which the circulating current occurs. By the operation of first switch S1 and second switch S2, an inductor current generated by the energy storage inductor L charges the first capacitor C1 or the second capacitor C2 to regulate the neutral voltage Vn for counteracting the affection of the circulating current. Thereby, the circulating current is suppressed. It is noted that the direction of the inductor current is opposite to that of the circulating current.

Figure 2:
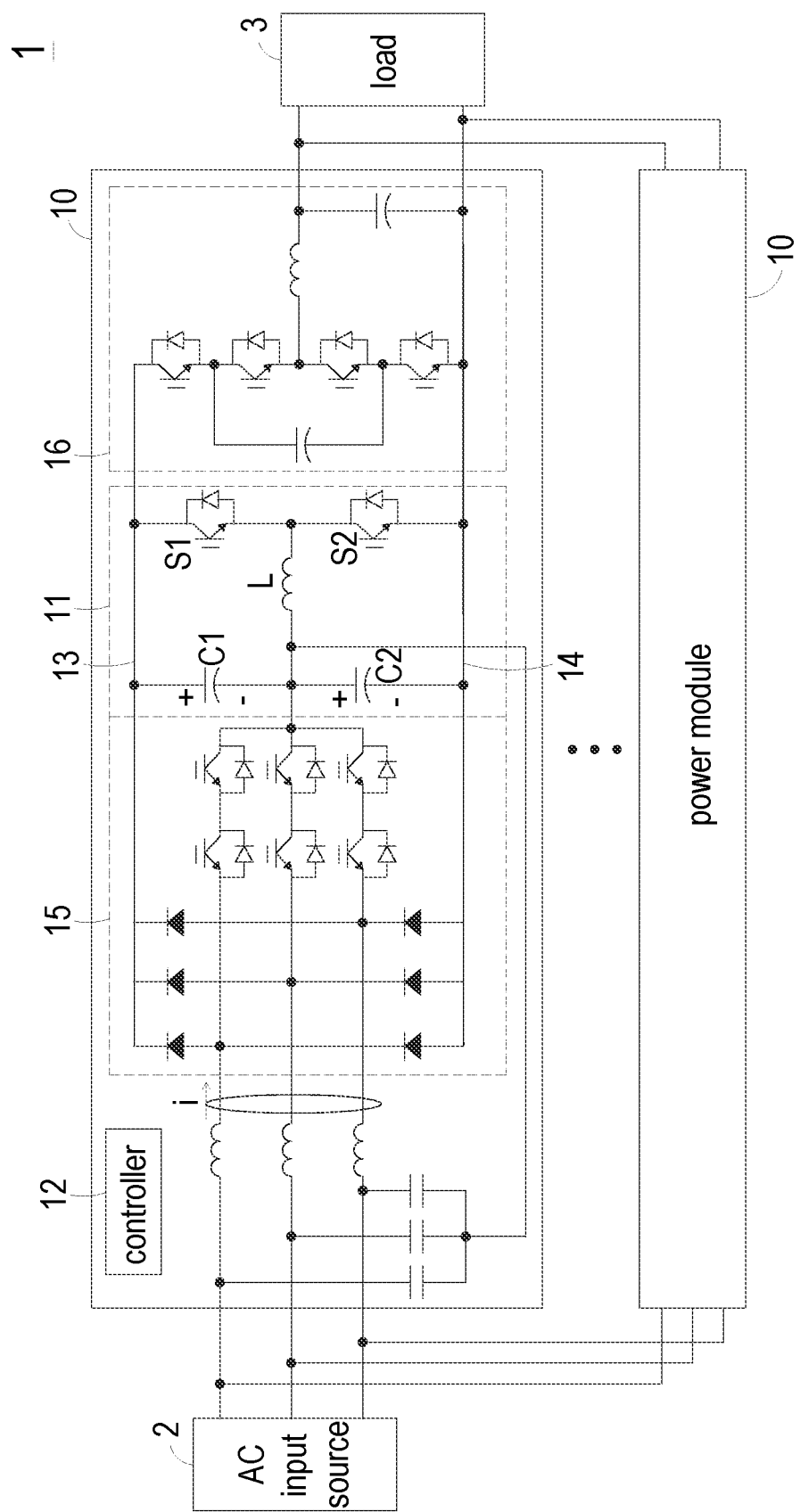
FIG. 2 is a circuit diagram illustrating an implementation of the power system of FIG. 1.

In an embodiment, each power module 10 further includes a conversion circuit 15. The conversion circuit 15 receives AC power from the AC input source 2 and outputs DC power to the high-voltage bus 13 and low-voltage bus 14 of the balance circuit 11. The conversion circuit 15 is for example but not limited to a Vienna rectifier (as exemplified in FIG. 2) and is used to perform power factor correction for the AC input source 2. In an embodiment, each power module 10 further includes a DC-DC converter 16 receiving the DC power from the high-voltage bus 13 and low-voltage bus 14. The DC-DC converter 16 may be a flying capacitor converter as exemplified in FIG. 2, but not exclusively. The balance circuit 11 is electrically coupled to the output of conversion circuit 15 and the input of DC-DC converter 16 through the high-voltage bus 13 and low-voltage bus 14. In addition, the outputs of all the power modules 10 are connected to the same load 3.

Figure 3:
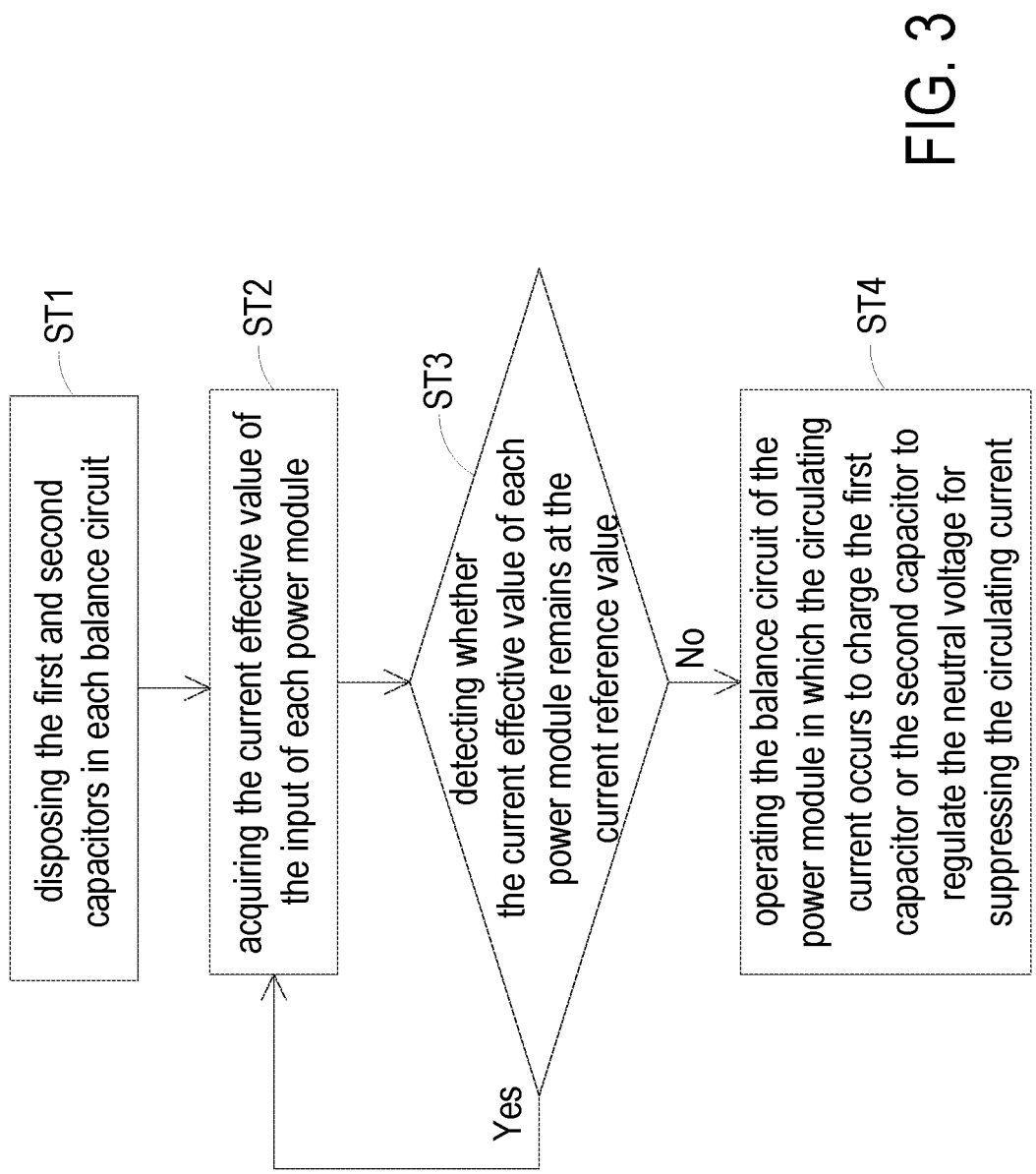
FIG. 3 is a schematic flow chart illustrating a circulating current suppression method of the power system according to an embodiment of the present disclosure.

Please refer to FIG. 1 and FIG. 3. FIG. 3 is a schematic flow chart illustrating a circulating current suppression method of the power system according to an embodiment of the present disclosure. The circulating current suppression method is applicable for the power system 1 of FIG. 1 and may be performed by the controller 12 of the power system 1. As shown in FIG. 3, firstly, in step ST1, the first capacitor C1 and the second capacitor C2 are disposed in each balance circuit 11. Then, in step ST2, the current effective value iz of the input of each power module 10 is acquired. Afterwards, in step ST3, whether the current effective value iz of each power module 10 remains at the current reference value iref is detected. If the result of step ST3 is negative (i.e., the current effective value iz of at least one power module 10 doesn't remain at the current reference value iref), it is determined that the circulating current occurs in the said at least one power module 10, and then the step ST4 is performed. In step ST4, the balance circuit 11 of the power module 10 in which the circulating current occurs is operated to charge the first capacitor C1 or the second capacitor C2 to regulate the neutral voltage Vn for suppressing the circulating current. On the contrary, if the result of step ST3 is positive (i.e., the current effective value iz of all power modules 10 remains at the current reference value iref), the step ST2 is performed again.

In an embodiment, when no circulating current occurs in the power modules 10 (i.e., the current effective value iz of each power module 10 remains at the current reference value iref), the low-voltage buses 14 of the power modules 10 all remain at the same reference voltage. In an embodiment, when the circulating current occurs in a power module 10, the first capacitor C1 or the second capacitor C2 in the power module 10 is charged to regulate the neutral voltage Vn for increasing the voltage of the low-voltage bus 14.

Figure 4:
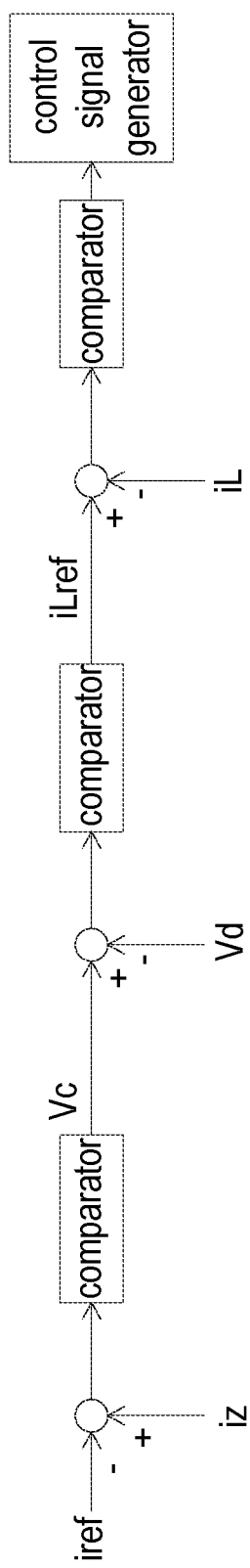
FIG. 4 schematically shows the control strategy of the circulating current suppression method of the power system of the present disclosure.

Please refer to FIG. 1 and FIG. 4. FIG. 4 schematically shows the control strategy of the circulating current suppression method of the power system of the present disclosure. It is noted that all the control actions for the power system 1 mentioned in the present disclosure are performed by the controller 12. As shown in FIG. 4, when the circulating current occurs in at least one power module 10, the power module 10 in which the circulating current occurs is identified as an abnormal power module. The difference between the current effective value iz of the abnormal power module and the current reference value iref is acquired, and a compensation voltage Vc is acquired according to the difference. Meanwhile, the capacitor voltage difference Vd between the second capacitor C2 and the first capacitor C1 of the abnormal power module is obtained. The capacitor voltage difference Vd is calculated by subtracting the voltage across the first capacitor C1 from the voltage across the second capacitor C2.

By comparing the compensation voltage Vc with the capacitor voltage difference Vd, the direction of circulating current can be determined, and thus the direction of inductor current and the capacitor being charged can be decided accordingly. In specific, if the compensation voltage Vc is greater than the capacitor voltage difference Vd, it is determined that the circulating current flows into the abnormal power module through its input. In this case, the first switch S1 and/or the second switch S2 is operated to charge the second capacitor C2. As a result, the inductor current of the energy storage inductor L flows from the second terminal of the energy storage inductor L to the first terminal of the energy storage inductor L. Conversely, if the compensation voltage Vc is less than the capacitor voltage difference Vd, it is determined that the circulating current flows into the abnormal power module through its output. In this case, the first switch S1 and/or the second switch S2 is operated to charge the first capacitor C1. As a result, the inductor current of the energy storage inductor L flows from the first terminal of the energy storage inductor L to the second terminal of the energy storage inductor L. In an embodiment, a reference value iLref of the inductor current is acquired according to the difference between the compensation voltage Vc and the capacitor voltage difference Vd. Moreover, the reference value iLref of the inductor current is compared with an actual value iL of the inductor current, and the control signals of the first switch S1 and second switch S2 are generated according to the comparison result. Consequently, based on the magnitude of the difference between the compensation voltage Vc and the capacitor voltage difference Vd, the time of charging the first capacitor C1 or the second capacitor C2 is determined, and the first switch S1 and/or the second switch S2 is operated accordingly.

In addition, after charging the first capacitor C1 or the second capacitor C2 in the power module 10 in which the circulating current occurs, whether the current effective value iz of the power module 10 remains at the current reference value iref is detected again. If the current effective value iz remains at the current reference value iref, the balance circuit 11 of the power module 10 is stopped operating. Alternatively, if the current effective value iz still doesn't remain at the current reference value iref, the balance circuit 11 is operated again to charge the first capacitor C1 or the second capacitor C2.

Figure 5:
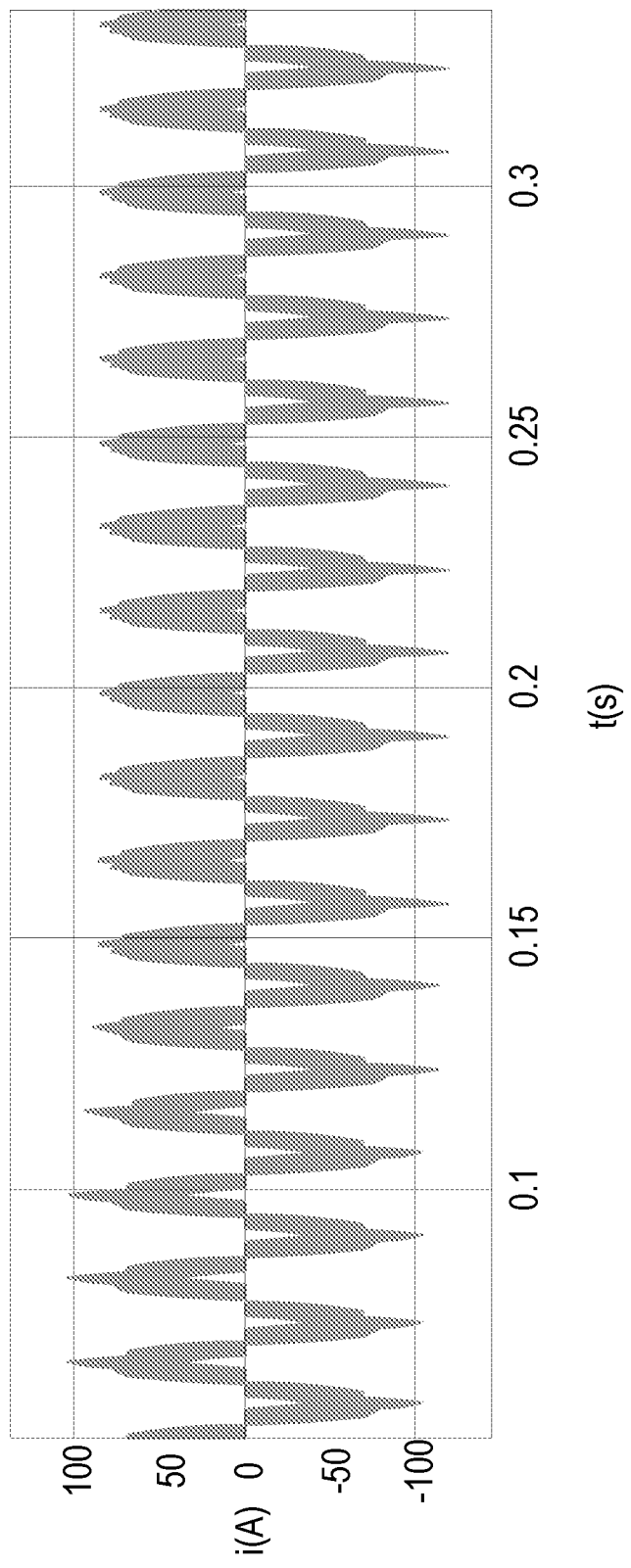
FIG. 5 schematically shows the current waveform simulation of the power module in which the circulating current occurs and is not suppressed.
Figure 6:
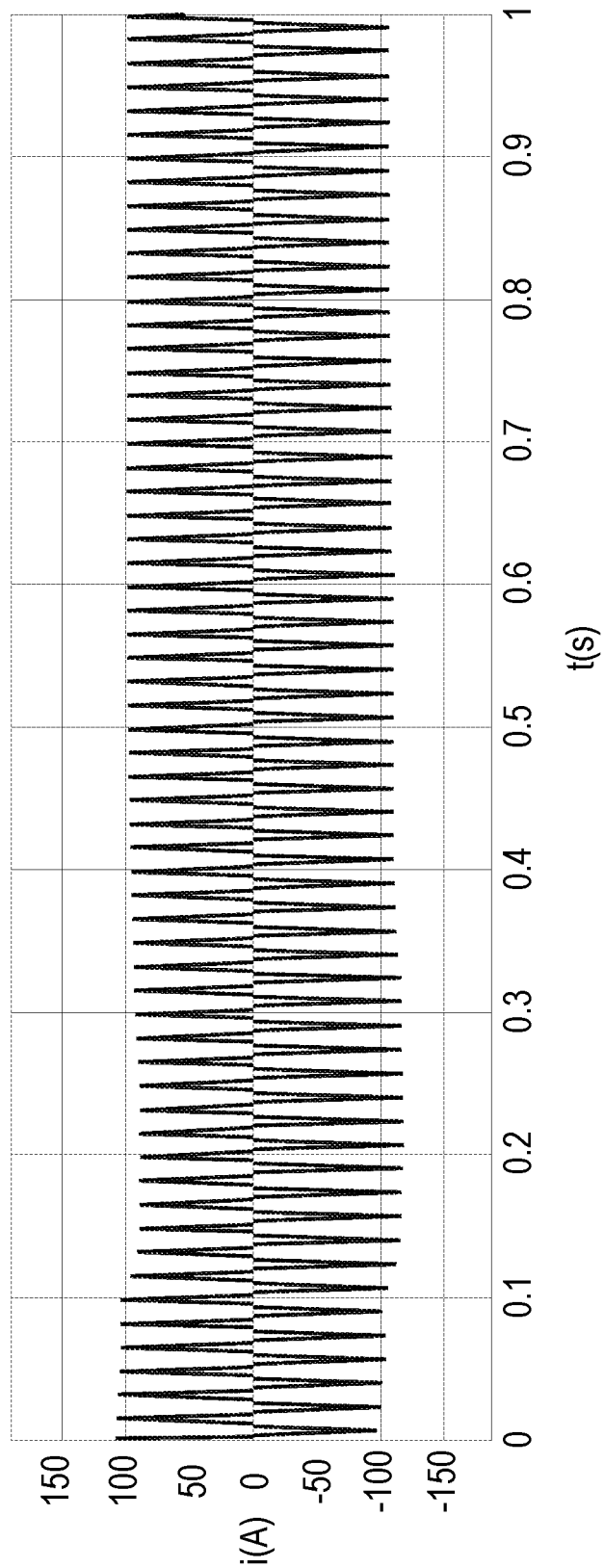
FIG. 6 schematically shows the current waveform simulation of the power module in which the circulating current occurs and is suppressed by adopting the circulating current suppression method of the present disclosure.
Figure 7:
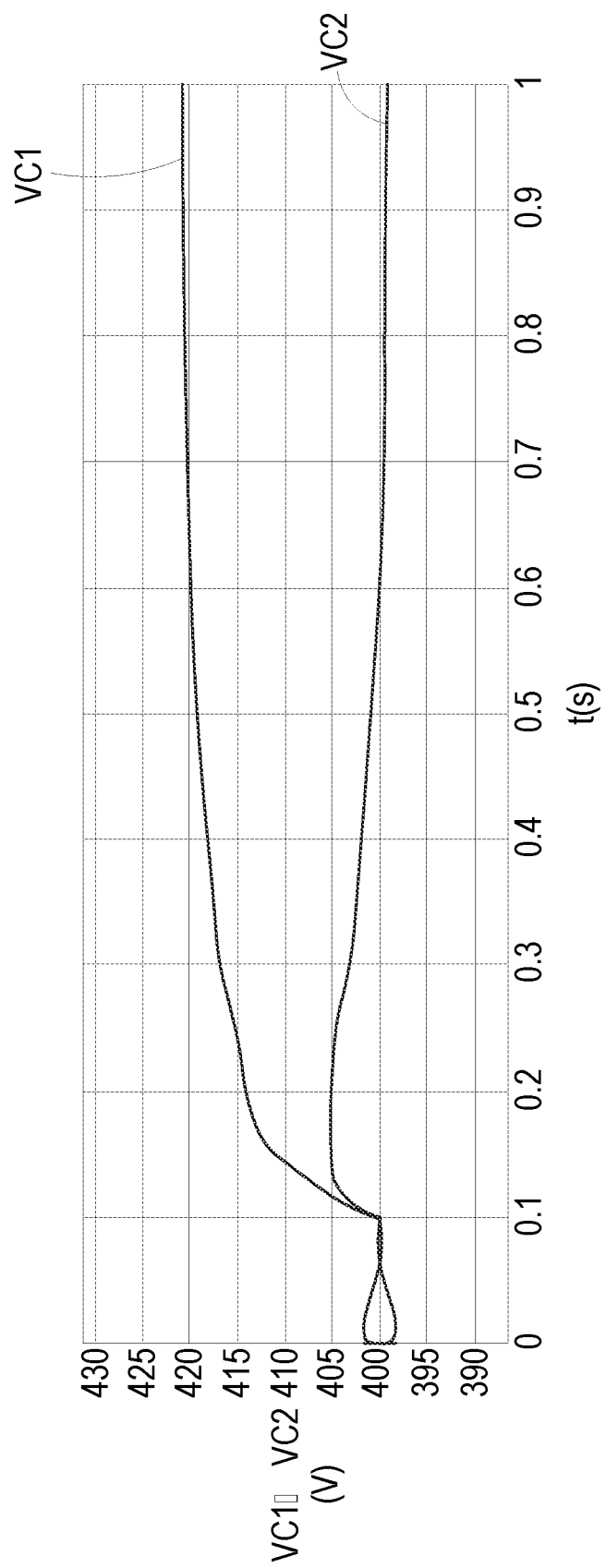
FIG. 7 schematically shows the capacitor voltage waveform simulation of the power module in which the circulating current occurs and is suppressed by adopting the circulating current suppression method of the present disclosure.

FIG. 5 schematically shows the current waveform simulation of the power module in which the circulating current occurs and is not suppressed. FIG. 6 schematically shows the current waveform simulation of the power module in which the circulating current occurs and is suppressed by adopting the circulating current suppression method of the present disclosure. FIG. 7 schematically shows the capacitor voltage waveform simulation of the power module in which the circulating current occurs and is suppressed by adopting the circulating current suppression method of the present disclosure. In FIG. 5 and FIG. 6, the current i of one phase of the input of the power module 10 is shown as an example. In FIG. 7, the voltage VC1 across the first capacitor C1 is depicted by solid lines, and the voltage VC2 across the second capacitor C2 is depicted by dashed lines. When the circulating current occurs, as shown in FIG. 5, the waveform of current i is affected by the circulating current and shifts. In this example, the circulating current flows into the power module through its output, resulting in a negative shift in the waveform of current i. By adopting the circulating current suppression method of the present disclosure, as shown in FIG. 6 and FIG. 7, the first switch S1 and/or the second switch S2 is operated to generate the inductor current flowing from the second terminal of energy storage inductor L to the first terminal of energy storage inductor L. Accordingly, the first capacitor C1 is charged to increase the voltage VC1 across the first capacitor C1, thereby suppressing the current shift caused by the circulating current and bringing the waveform of current i back to the state with no circulating current.

In summary, the present disclosure provides a power system and a circulating current suppression method thereof. The power system has a plurality of power modules. When the circulating current occurs in any of the power modules, the balance circuit of the power module is operated to regulate the neutral voltage of the balance circuit for suppressing the circulating current.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A circulating current suppression method of a power system having a plurality of power modules, wherein each of the plurality of power modules comprises a high-voltage bus, a low-voltage bus and a balance circuit having a neutral voltage, and the circulating current suppression method comprises:
   in each of the balance circuits, disposing a first capacitor electrically coupled between the high-voltage bus and the neutral voltage, and disposing a second capacitor electrically coupled between the neutral voltage and the low-voltage bus;
   acquiring a current effective value of an input of each of the plurality of power modules;
   if detecting that the current effective value of at least one of the plurality of power modules doesn't remain at a current reference value, determining that a circulating current occurs in the at least one of the plurality of power modules; and
   operating the balance circuit of the at least one of the plurality of power modules to charge the first capacitor or the second capacitor to regulate the neutral voltage for suppressing the circulating current.

2. The circulating current suppression method according to claim 1, further comprising:

identifying the at least one of the plurality of power modules as an abnormal power module;

acquiring a difference between the current effective value of the abnormal power module and the current reference value, and acquiring a compensation voltage according to the difference;

acquiring a capacitor voltage difference between the second capacitor and the first capacitor of the abnormal power module; and by comparing the compensation voltage with the capacitor voltage difference, determining whether the circulating current flows into the abnormal power module through the input thereof or through an output thereof.

3. The circulating current suppression method according to claim 2, further comprising:

if the compensation voltage is greater than the capacitor voltage difference, determining that the circulating current flows into the abnormal power module through the input of the abnormal power module; and if the compensation voltage is less than the capacitor voltage difference, determining that the circulating current flows into the abnormal power module through the output of the abnormal power module.

4. The circulating current suppression method according to claim 2, further comprising:

disposing an energy storage inductor, a first switch and a second switch in the balance circuit, wherein a first terminal of the energy storage inductor is electrically coupled to the neutral voltage, the first switch is electrically coupled between the high-voltage bus and a second terminal of the energy storage inductor, and the second switch is electrically coupled between the second terminal of the energy storage inductor and the low-voltage bus; and in the balance circuit of each of the plurality of power modules, operating the first switch and/or the second switch to charge the first capacitor or the second capacitor.

5. The circulating current suppression method according to claim 4, further comprising:

if the compensation voltage is greater than the capacitor voltage difference, operating the first switch and/or the second switch to charge the second capacitor, wherein when the second capacitor is charged, an inductor current of the energy storage inductor flows from the second terminal of the energy storage inductor to the first terminal of the energy storage inductor.

6. The circulating current suppression method according to claim 4, further comprising:

if the compensation voltage is less than the capacitor voltage difference, operating the first switch and/or the second switch to charge the first capacitor, wherein when the first capacitor is charged, an inductor current of the energy storage inductor flows from the first terminal of the energy storage inductor to the second terminal of the energy storage inductor.

7. The circulating current suppression method according to claim 1, further comprising:

after charging the first capacitor or the second capacitor, detecting whether the current effective value of the at least one of the plurality of power modules remains at the current reference value; and if the current effective value of the at least one of the plurality of power modules remains at the current reference value, stop operating the balance circuit.

8. The circulating current suppression method according to claim 1, wherein when it is determined that no circulating current occurs in the plurality of power modules, the low-voltage bus of each of the plurality of power modules remains at a reference voltage.

9. The circulating current suppression method according to claim 1, wherein through charging the first capacitor or the second capacitor, the neutral voltage is regulated to increase a voltage of the low-voltage bus.

10. The circulating current suppression method according to claim 1, further comprising: disposing the input of each of the plurality of power modules to be electrically coupled to an AC input source, and disposing an output of each of the plurality of power modules to be electrically coupled to a load.

11. The circulating current suppression method according to claim 1, wherein the current effective value is a current average value or a current root-mean-square value.

* * * * *